Jan. 31, 1967  G. BERKOWITZ  3,300,807
CLEANING APPARATUS
Filed Dec. 7, 1964
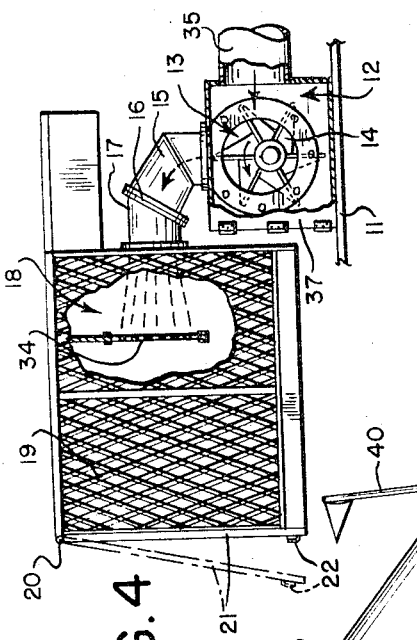
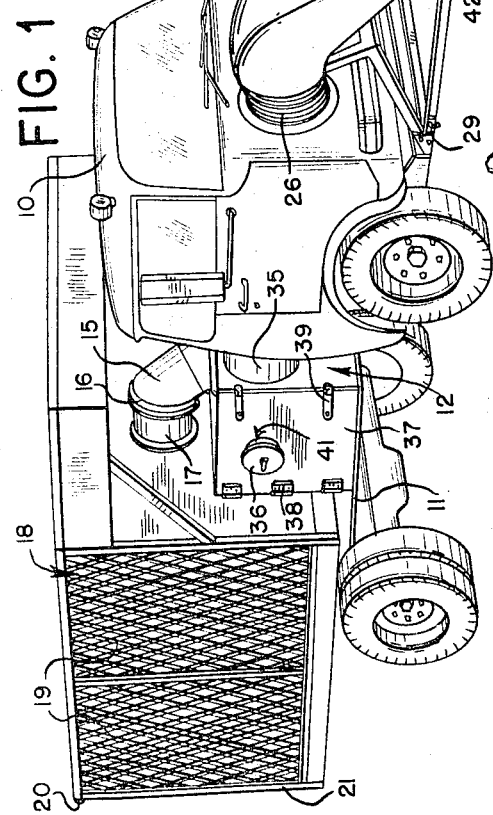
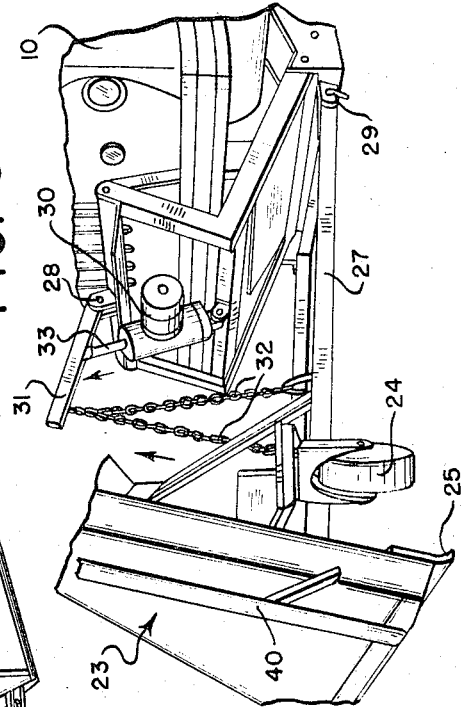
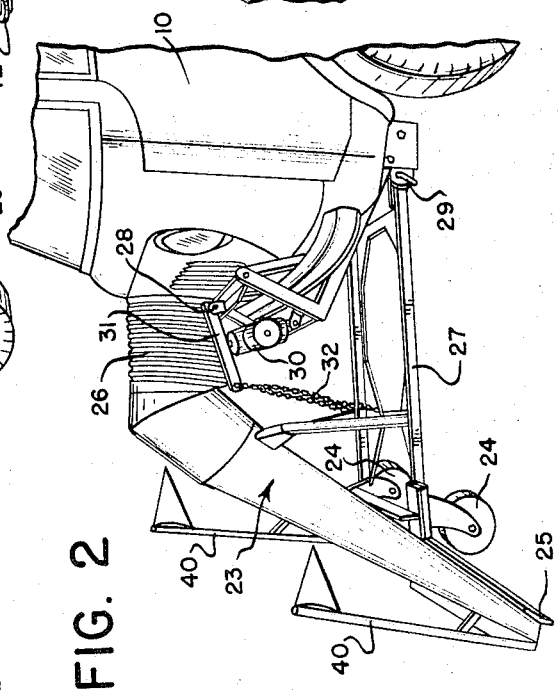
INVENTOR
George Berkowitz
BY
ATTORNEY

# United States Patent Office 3,300,807
Patented Jan. 31, 1967

3,300,807
CLEANING APPARATUS
George Berkowitz, Monsey, N.Y., assignor of ten percent to Aaron B. Karas, five percent to Morris Newman, and five percent to Noah Mintz
Filed Dec. 7, 1964, Ser. No. 416,356
6 Claims. (Cl. 15—340)

The present invention relates to an apparatus for cleaning automobile parking lots and the like.

At present with the mass exodus of the public from the cities to the suburbs, great shopping centers have developed in many areas. These shopping centers rely upon automobiles as the means of conveying the customers to and from the shopping centers and accordingly, it has been necessary to locate adjacent to said shopping centers, parking lots of substantial area. As is normal in the case where numerous persons frequent public areas, such as parking lots, the areas become littered with scraps of paper, pebbles, glass, stones, flattened tin cans, road dirt and other debris.

Devices have been employed for cleaning parking lots but most of such devices have many shortcomings. Most are of a rather small, underpowered nature incapable of properly cleaning the modern day parking lots. Many rely upon brush sweeping means in order to collect the debris, dust, dirt and other soils and are rather inefficient. Others rely on suction means to accomplish the necessary cleaning. However, where suction type devices have been employed, they generally have been highly unsatisfactory since all the foreign matter passes through the fan, striking the fan blades, causing considerable damage and requires frequent replacement.

It, therefore, is an object of this invention to provide a movable suction device for picking up paper, pebbles, glass, stones, road dirt and other such debris.

It is a further object of the present invention to provide the suction unit with a flexible mounting in order to facilitate its operation while at the same time permitting it to remain in close communication with the surface area being cleaned regardless of the contour or unevenness thereof.

It is yet a further object of the present invention to provide a highly mobile apparatus capable of being operated by one man entirely from within the cab while providing the operator with maximum visibility of the area to be cleaned.

It is yet a further object of the present invention to provide such an apparatus with means whereby the suction tool can be raised from the surface being cleaned so as to permit the apparatus to be moved from one area to another on the public highways at normal rates of speed.

It is yet a further object of the invention to provide an apparatus of the character herewithin described, in which the power source driving the suction fan is operated independently from the source of power driving the wheels of the apparatus so as to avoid power loss to the wheels with a concurrent reduction in speed and cleaning rate.

With the foregoing objects in view and such objects and advantages as will become apparent to those skilled in the art to which this invention relates, my invention consists essentially in the arrangement and construction of the apparatus and its cooperating parts all as hereinafter more particularly described.

The means by which the foregoing and other objects are accomplished and the manner of their accomplishment will be readily understood from the following specification upon reference to the accompanying drawings in which:

FIGURE 1 is a perspective view of the cleaning apparatus constructed in accordance with the present invention.

FIGURE 2 is a fragmentary perspective view of a portion of the apparatus showing the suction tool and hydraulic means for raising the tool in operating position.

FIGURE 3 is an enlarged fragmentary perspective view of the apparatus showing the suction tool in elevated position.

FIGURE 4 is a reduced scale side view partially broken away of the portion of the apparatus to the rear of the cab.

The cleaning apparatus constructed according to my invention may be readily driven about on public highways and streets.

Referring first to FIGURE 1, the cleaning apparatus has a cab over engine 10 with all controls contained therein mounted on a truck chassis 11 having at least four wheels and conventional hydraulic dump means (not shown). The chassis also has mounted thereon a drop box 12 which is mounted adjacent to and operably connected with a fan chamber 13. The fan chamber 13 contains a suction fan 14 and is detachable connected by duct 15 at air tight joint 16 to duct 17. Duct 17 is operably connected to collection chamber 18 which has removable dust filter sides and top (not shown) attached to and supported by expanded metal walls 19. The rear of the collection chamber 18 is provided with a hinge arrangement at the upper end thereof 20 upon which is mounted a discharge door 21 fastened to the lower rear end of collection chamber 18 by latching device 22. The cab 10 has mounted thereon a suction tool 23 with caster wheels 24 spring loaded which are preferably spring mounted and flexible seal 25. Suction tool 23 is connected to drop box 12 by flexible coupling 26 which passes through cab 10. Suction tool 23 is also connected to the front end of cab 10 through suction tool support frame 27 by upper and lower pivotal mounting means 28 and 29 and provided with a hydraulic cylinder-piston assembly 30 coupled to a suitable pumping mechanism by hydraulic hoses which permits suction tool 23 to be raised and lowered as desired by the operator using controls located within cab 10. Suction fan 14 is independently powered by an internal combustion engine (not shown) with all controls located within cab 10.

In operation, the apparatus illustrated in FIGURE 1 is driven to the parking lot to be cleaned. The operator while seated in the cab 10 lowers suction tool 23 by use of controls within the cab which activate the hydraulic cylinder-piston assembly 30 by means of a suitable pumping mechanism such as is now a usual part of truck power plants and starts the suction fan engine. The apparatus with suction tool 23 riding on caster wheels 24 which are in contact with the surface to be cleaned is then put into gear by the operator in order to start the cleaning operation. As the apparatus moves across the surface being cleaned the paper, pebbles, glass, stones, flattened tin cans, road dirt and other debris is sucked in through the orifice in suction tool 23 and passes through flexible coupling 26 and duct 35 into drop box 12 and then into fan chamber 13 wherefrom it is blown under pressure through ducts 15 and 17 into collection chamber 18. The air is permitted to pass through the dust filter sides and top which are supported by expanded metal walls 19 or other similar support means. The extremely great surface area provided by the dust filter walls and top permits the pressure within collection chamber 18 to drop significantly causing the air borne debris to drop to the floor of the collection chamber.

FIGURE 2 illustrates the suction tool 23 in operating position with caster wheels 24 and flexible seal 25 in contact with the ground. In this position flexible coupling 26 is in the extended position, the piston 33 in the hydraulic cylinder-piston assembly 30 is in retracted position and the suction tool support frame 27 in lowered position. Suction tool 23 is also provided with curb wheel 42, preferably spring loaded which prevents excessive wear of the tool edge when used against street curbs. Guide posts 40 are mounted on the lower front edges of suction tool 23.

FIGURE 3 illustrates suction tool 23 in elevated position ready for travel. Suction tool 14 is elevated from the operating position as illustrated in FIGURE 2 by piston 33 in hydraulic cylinder-piston assembly 30, being forced into the extended position by hydraulic pressure. Piston 33 is forced against suction tool elevating member 31 which raises lift chain 32 while pivoting on upper pivotal mounting means 28. Lift chain 32 attached to suction tool support frame 27 raises suction tool 23 as piston 33 continues to move into its extended position thereby elevating the entire assembly. Suction tool support frame 27 pivots on lower pivotal mounting means 29 as it is being lowered or raised.

FIGURE 4 illustrates the path of flow of the debris collected after passing through suction tool 23. The debris passes through duct 35 into drop box 12 where the heavy material capable of damaging suction fan 14 drops out of the air stream due to a decrease in velocity. The remaining debris passes into fan chamber 13 which is adjacent to and operably connected with drop box 12 and is blown by suction fan 14 through ducts 15 and 17 into collection chamber 18. Discharge baffle 34 is an expanded metal or other open metal baffle located in the path of the debris entering the collection chamber. The solid debris strikes baffle 34, loses velocity and drops and the lighter and/or smaller size material passes through discharge baffle 34 thereby permitting a more uniform chamber loading. Discharge baffle 34 is located in the upper half of collection chamber 18, mounted to the side walls thereof and located in the debris discharge path.

In discharging the loaded collection chamber, the operator releases latching device 22 and engages the hydraulic dump means which tilts collection chamber 18 permitting discharge door 21 to swing open and the contents slide out. As collection chamber 18 is tilted, duct 15 is detached from duct 17 at air tight joint 16. Drop box 12 may be opened for cleaning by unlocking latching device 39 and opening drop box door 37 mounted on hinges 38.

Drop box 12 also has auxiliary means for cleaning street catch basins, man-holes and the like. The operator may employ such means by removing auxiliary suction tool adapter cover 36 and attaching a flexible hose to auxiliary suction tool adapter 41. Duct 35 is provided with valve means (not shown) which shuts the air flow from suction tool 23 when the auxiliary suction tool is employed.

It will be apparent from the foregoing that my invention provides a number of features heretofore unavailable in a cleaning apparatus of the type described. The cab over engine provides optimum visability for the operator of the apparatus. The suction tool is mounted on the front of the cab and is offset so as to project beyond the right side of the vehicle thereby enabling the tool to be readily used up against street curbs. The suction tool, when the apparatus is in operation, sucks the debris through its orifice, the material then passing through a flexible coupling and a duct into a drop box where the heavy material capable of damaging the suction fan falls out of the air stream due to the reduced velocity in the box. The debris remaining in the air stream passes through the suction fan chamber and is blown through discharge ducts into a collection box. As the debris passes out of the discharge duct into the collection box, it strikes an expanded metal or other open metal baffle which permits part of the debris to pass through the baffle to the rear of the collection chamber thus providing more uniform distribution. As a further aid to optimum visability, the suction tool is provided with guide posts so that the operator at all times sees the precise location of the lower edges of the tool in relation to the area being cleaned.

What is claimed is:
1. A cleaning apparatus comprising:
    a wheeled truck chassis;
    a power driven suction fan mounted on said chassis;
    a drop box mounted on the air intake side of said suction fan housing, the inlet to said drop box being mounted on a wall adjacent a wall containing the air intake to said fan thereby creating an angular change in direction of air flow through the drop box;
    a suction tool operably mounted on the front of said apparatus to suck debris from a surface along which the apparatus is advanced and operably connected by flexible coupling and duct means to said suction fan;
    a collection chamber mounted on the rear of said apparatus and operably connected by duct means to said suction fan;
    and debris discharge means located at the rear end thereof.
2. A cleaning apparatus as recited in claim 1, in which the collection chamber has mounted therein a discharge baffle located in the path of the suction fan discharge air stream and the suction fan is mounted adjacent to and operably connected with a drop box.
3. A cleaning apparatus comprising:
    a wheeled truck chassis;
    a power driven suction fan mounted on said chassis;
    a drop box being mounted adjacent to and being operably connected to said suction fan;
    a suction tool operably mounted on the front of said apparatus to suck debris from a surface along which the apparatus is advanced and operably connected by flexible coupling and duct means to said drop box;
    a collection chamber mounted on the rear of said apparatus and operably connected by duct means and detachable joint means to said suction fan, said collection chamber having expanded metal side walls and top with dust filters detachably mounted and supported thereon and an expanded metal discharge baffle mounted therein located in the path of the suction fan discharge air stream and dumpable debris discharge means at the rear end thereof.
4. A cleaning apparatus as recited in claim 3 in which the suction tool is offset and projects beyond the right side of the apparatus.
5. A cleaning apparatus as recited in claim 3 in which the drop box has adapter means for use with auxiliary suction tools.
6. A cleaning apparatus as recited in claim 1 wherein the air flow through the drop box is a right angle flow.

References Cited by the Examiner
UNITED STATES PATENTS

| | | | |
|---|---|---|---|
| 984,779 | 2/1911 | Sander | 15—353 X |
| 1,016,263 | 2/1912 | Green | 15—340 |
| 2,458,258 | 1/1949 | Furr | 15—340 |
| 2,663,894 | 12/1953 | Elliotte | 15—340 |
| 3,052,908 | 9/1962 | Daneman | 15—340 |

FOREIGN PATENTS 187,843    7/1907    Germany.

ROBERT W. MICHELL, *Primary Examiner.*